(12) United States Patent
Ishida et al.

(10) Patent No.: US 8,539,324 B2
(45) Date of Patent: Sep. 17, 2013

(54) PROCESSING UNIT

(75) Inventors: Tsutomu Ishida, Kawasaki (JP); Yuzi Kanazawa, Setagaya (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/596,818

(22) Filed: Aug. 28, 2012

(65) Prior Publication Data

US 2013/0104009 A1   Apr. 25, 2013

(30) Foreign Application Priority Data

Oct. 21, 2011   (JP) ................................. 2011-231796

(51) Int. Cl.
    *G06F 11/00*      (2006.01)
(52) U.S. Cl.
    USPC .......................................................... 714/798
(58) Field of Classification Search
    None
    See application file for complete search history.

(56) References Cited

U.S. PATENT DOCUMENTS

| | | | |
|---|---|---|---|
| 5,517,132 A | 5/1996 | Ohara | |
| 6,101,621 A | 8/2000 | Kondo | |
| RE37,475 E | 12/2001 | Ohara | |
| RE38,152 E | 6/2003 | Ohara | |
| 7,188,284 B2 * | 3/2007 | Mitra et al. | 714/726 |
| 8,312,232 B2 * | 11/2012 | Fujisawa | 711/154 |
| 8,341,471 B2 * | 12/2012 | Swoboda | 714/724 |
| 2008/0155358 A1 * | 6/2008 | Arataki et al. | 714/47 |
| 2011/0161549 A1 * | 6/2011 | Hashimoto | 711/3 |

FOREIGN PATENT DOCUMENTS

| | | |
|---|---|---|
| JP | 9-116413 A | 5/1997 |
| JP | 10-312409 A | 11/1998 |
| JP | 2001-166987 A | 6/2001 |

* cited by examiner

*Primary Examiner* — Guerrier Merant
(74) *Attorney, Agent, or Firm* — Arent Fox LLP

(57) ABSTRACT

A processing unit includes: a cache memory including a plurality of memory elements; an error detection circuit configured to detect an error when a first timing for reading data from the cache memory is behind a threshold; a latch circuit configured to set a second timing for latching the data based on an output from the error detection circuit and to latch the data at the second timing; and a processing unit core to process the data latched by the latch circuit.

9 Claims, 9 Drawing Sheets

PROCESSING UNIT

CROSS-REFERENCE TO RELATED APPLICATION(S)

This application is based upon and claims the benefit of priority of the prior Japanese Patent Application No. 2011-231796, filed on Oct. 21, 2011, the entire contents of which are incorporated herein by reference.

FIELD

The embodiments discussed herein are related to processing units.

BACKGROUND

A processing unit includes, for example, a processing unit core, a primary cache memory, and a secondary cache memory. The secondary cache memory has a larger data storage capacity than the primary cache memory, and therefore has longer readout time. The readout time of the secondary cache memory may cause a reduction in a clock signal frequency.

Related technologies are disclosed in Japanese Laid-open Patent Publication No. 9-116413, Japanese Laid-open Patent Publication No. 2001-166987, and Japanese Laid-open Patent Publication No. 10-312409.

SUMMARY

According to one aspect of the embodiments, a processing unit includes: a cache memory including a plurality of memory elements; an error detection circuit configured to detect an error when a first timing for reading data from the cache memory is behind a threshold; a latch circuit configured to set a second timing for latching the data based on an output from the error detection circuit and to latch the data at the second timing; and a processing unit core to process the data latched by the latch circuit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
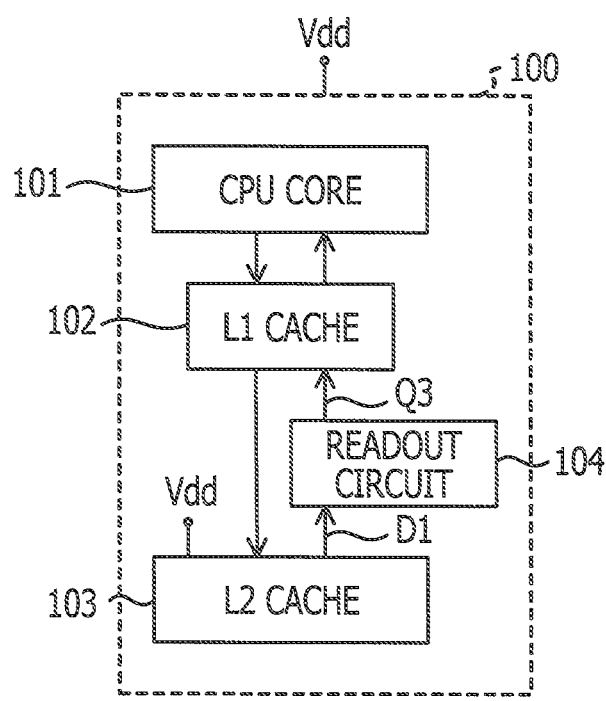
FIG. 1 illustrates an exemplary central processing unit.

FIG. 1 illustrates an exemplary central processing unit. A central processing unit 100 includes a central processing unit core 101, a primary cache memory 102, a secondary cache memory 103, and a readout circuit 104, and operates based on a power supply voltage Vdd. The primary cache memory 102 and the secondary cache memory 103 may each be, for example, a static random access memory (SRAM), and include a plurality of memory elements, each of which stores multiple data. A data storage capacity of the secondary cache memory 103 is larger than that of the primary cache memory 102. The central processing unit core 101 designates an address and sends a data read instruction to the primary cache memory 102. When the primary cache memory 102 stores data of the designated address, a cache hit occurs, and the primary cache memory 102 outputs the data of the designated address to the central processing unit core 101. When the primary cache memory 102 does not store the data of the designated address, a cache miss occurs, and a data read instruction of the designated address is sent to the secondary cache memory 103. When the secondary cache memory 103 stores the data of the designated address, a cache hit occurs. The data of the designated address in the secondary cache memory 103 is written in the primary cache memory 102 through the readout circuit 104 and output to the central processing unit core 101. When the primary cache memory 103 does not store the data of the designated address, a cache miss occurs, and a data read instruction of the designated address is sent to a main memory. The data of the designated address in the main memory is written in the secondary cache memory 103 and the primary cache memory 102, and output to the central processing unit core 101. The central processing unit core 101 processes the data from the primary cache memory 102, the secondary cache memory 103, or the main memory.

The secondary cache memory 103 operates based on the power supply voltage Vdd, and outputs data D1 of a designated address to the readout circuit 104. The readout circuit 104 latches the data D1 in synchronization with a clock signal, and outputs latched data Q3 to the primary cache memory 102.

Figure 2:
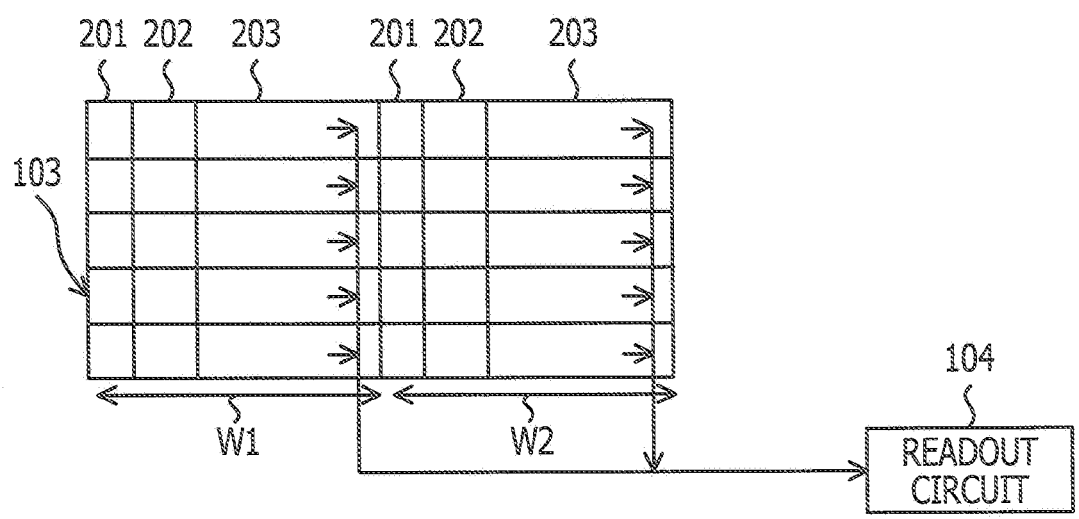
FIG. 2 illustrates an exemplary secondary cache memory.

FIG. 2 illustrates an exemplary secondary cache memory. The secondary cache memory illustrated in FIG. 2 may be the secondary cache memory 103 illustrated in FIG. 1. A configuration of the primary cache memory 102 illustrated in FIG. 1 may be substantially the same as or similar to that of the secondary cache memory 103. The secondary cache memory 103 may be an n-way set associative memory including n-number of ways W1, W2, etc. Each of the ways W1, W2, etc. includes a plurality of entries. Each entry includes a valid bit 201, an address 202, and data 203. The secondary cache memory 103 stores a plurality of data 203 in each of the plurality of memory elements. For the data 203 stored in the plurality of memory elements, readout paths to the readout circuit 104 have different wiring lengths. Readout time of the data 203 may be shorter when the memory element has the readout path of a shorter wiring length. The readout time of the data 203 may be longer when the memory element has the readout path of a longer wiring length.

The secondary cache memory 103 has a larger data storage capacity than the primary cache memory 102, and is configured such that the readout paths of the memory elements have longer wiring lengths. Thus, the readout time of the data 203 becomes longer. The readout circuit 104 latches the data D1 from the secondary cache memory 103 in synchronization with the clock signal. When the readout time of the secondary cache memory 103 is longer, a frequency of the clock signal may reduced, and thus a processing speed of the central processing unit 100 may decrease.

In designing the central processing unit 100, the data readout time from the secondary cache memory 103 may become a bottleneck in a determination of the clock signal frequency. For example, 6σ of probability distribution of the readout time for the plurality of memory elements may be used as a design value of the data readout time from the secondary cache memory 103. Since the design value includes a timing margin, a clock signal frequency with an ample margin may be used.

In the central processing unit 100, the probability of using a path where the readout time corresponds to a value of 6σ of probability distribution may be small. For example, when the secondary cache memory 103 has the storage capacity of 6 megabytes, several paths have the value of 6σ. And if such paths of 6σ are ever used, a frequency of use may be low. A critical path having a timing margin may become a bottleneck in the determination of the clock signal frequency of the central processing unit 100.

Figure 3:
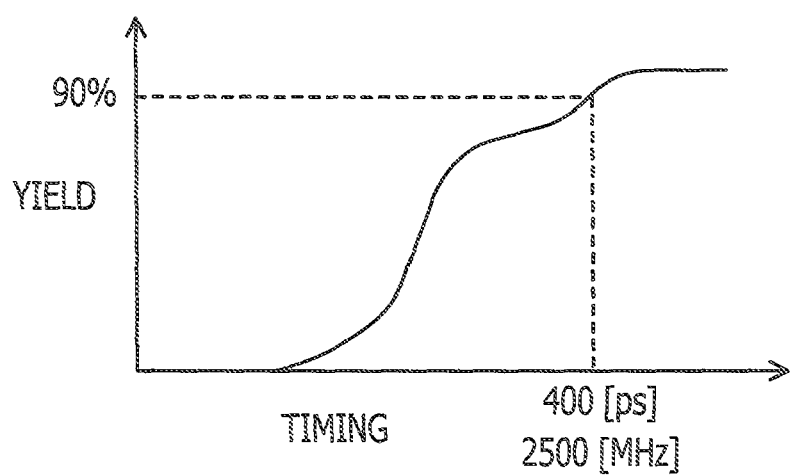
FIG. 3 illustrates an exemplary timing yield of readout paths.

FIG. 3 illustrates an exemplary timing yield of a readout path. FIG. 3 may illustrate a graph of the timing yield of the readout paths from the plurality of memory elements in the secondary cache memory 103 to the readout circuit 104. The horizontal axis represents the readout timing (time or frequency) of the secondary cache memory 103. The vertical axis represents the timing yield of timings when data is read in time from among a plurality of paths from the plurality of memory elements in the secondary cache memory 103 to the readout circuit 104. A cumulative yield distribution chart illustrated in FIG. 3 may be obtained by using a static timing analysis (STA) or a statistical static timing analysis (SSTA). For example, when the readout timing is 400 ps (clock frequency of 2500 MHz), the yield may be 90%. Of all the paths from the plurality of memory elements in the secondary cache memory 103 to the readout circuit 104, 90% of the paths may have the readout timing of 400 ps or less.

In the data readout from the secondary cache memory 103, the clock signal frequency may be set in response to the yield without using the critical path having the timing margin. For example, the clock signal frequency at which the yield reaches 90% is set to 2500 MHz. An error detection circuit may be provided in the readout circuit 104. When a delay (fail) of data arrival from the secondary cache memory 103 is detected, an error is detected and the data D1 is latched after waiting one cycle. Based on a fail rate of the data arrival from the secondary cache memory 103, a most suitable clock signal frequency is set.

Figure 4:
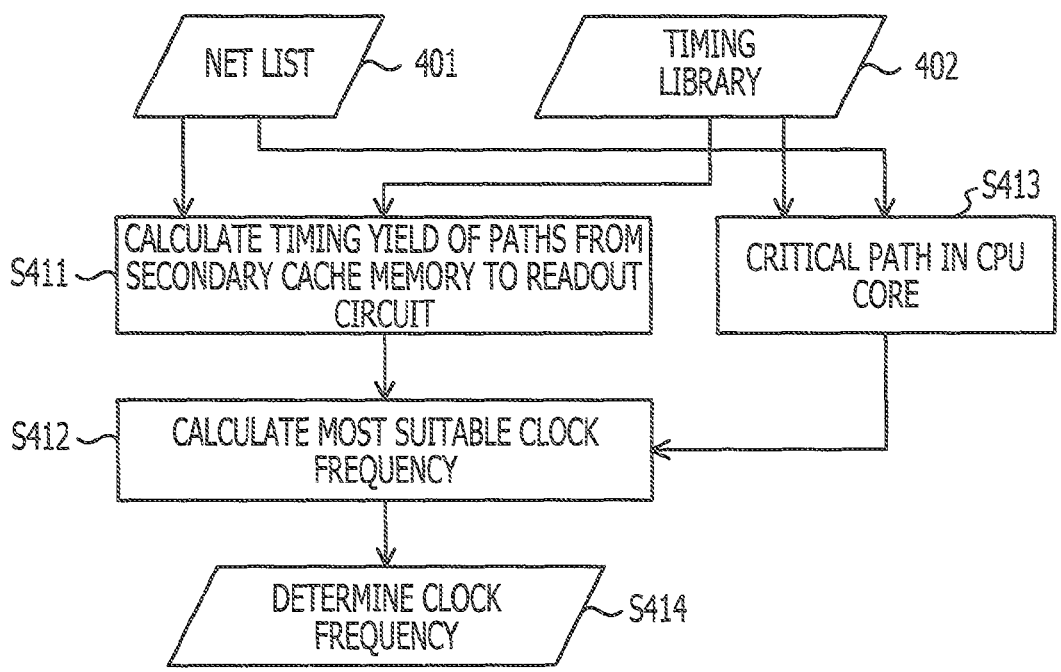
FIG. 4 illustrates an exemplary computer aided designing.

FIG. 4 illustrates an exemplary computer aided designing. FIG. 4 illustrates a determination process of the clock signal frequency by a computer aided design (CAD) apparatus. The CAD apparatus stores a net list 401 and a timing library 402. The net list 401 may be circuit design data indicating a circuit configuration. The timing library 402 includes circuit timing (delay time) information.

In an operation S411, the CAD apparatus calculates the timing yield of the paths from the plurality of memory elements in the secondary cache memory 103 to the readout circuit 104 as illustrated in FIG. 3, using the static timing analysis or the statistical static timing analysis based on the net list 401 and the timing library 402.

In an operation S413, the CAD apparatus detects a critical path in the central processing unit core 101 based on the net list 401 and the timing library 402, and calculates an upper limit of the clock signal frequency based on the critical path.

In an operation S412, the CAD apparatus calculates a most suitable clock signal frequency within a frequency range less than the upper limit of the clock signal frequency calculated in the operation S413, based on the timing yield calculated in the operation S411.

In an operation S414, the CAD apparatus determines the frequency calculated in the operation S412 as the clock signal frequency. For example, the clock signal frequency at which the yield reaches 90% may be set to 2500 MHz.

Figure 5:
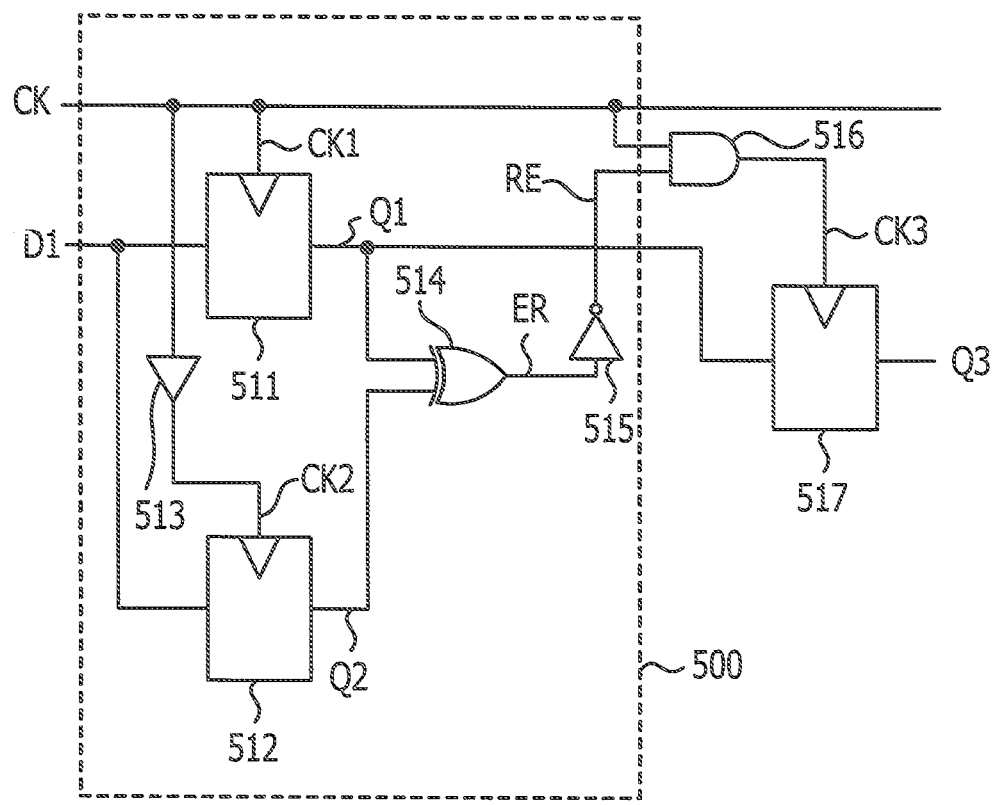
FIG. 5 illustrates an exemplary readout circuit.
Figure 6:
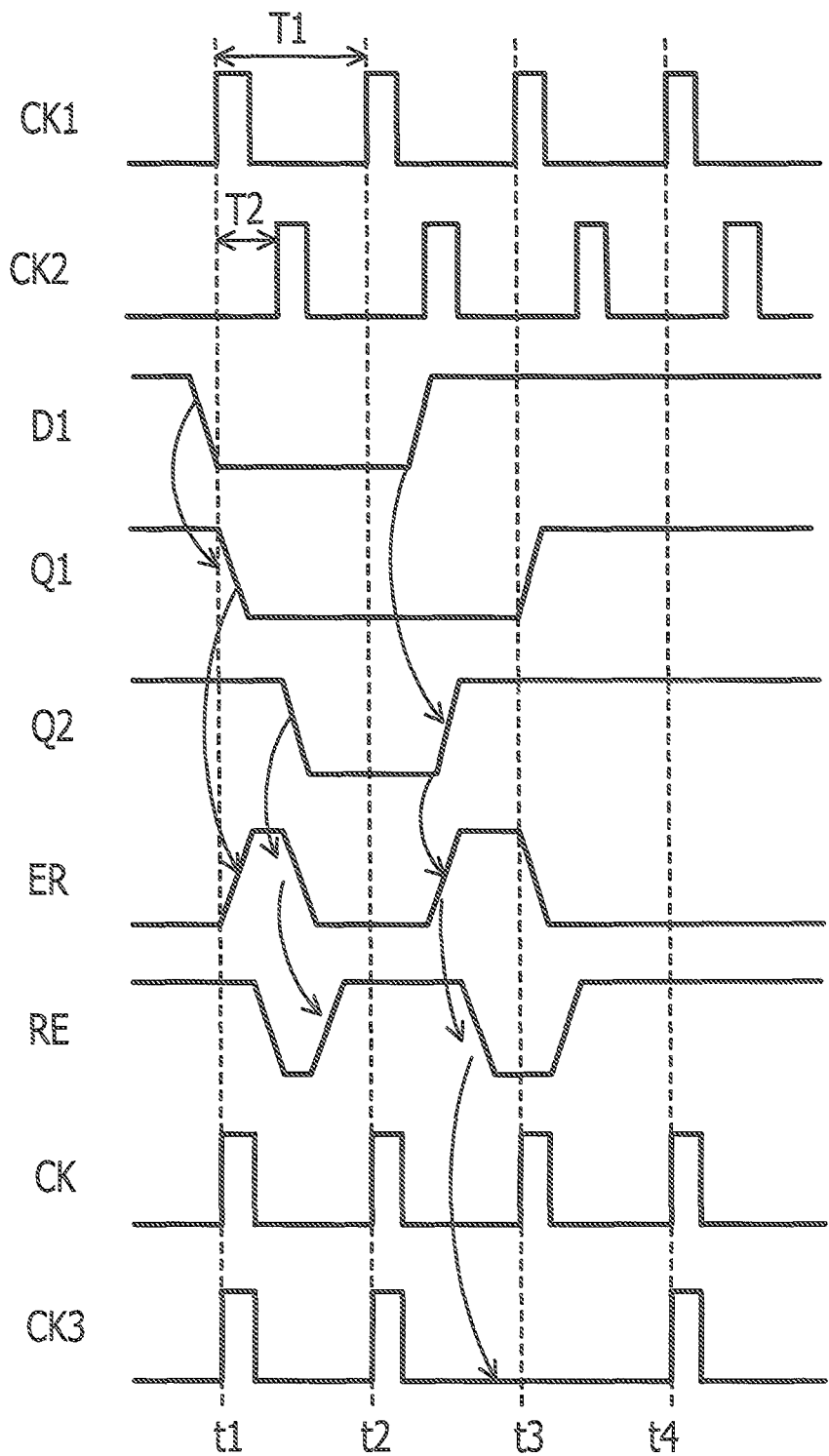
FIG. 6 illustrates an exemplary readout circuit operation.

FIG. 5 illustrates an exemplary readout circuit. The readout circuit illustrated in FIG. 5 may be the readout circuit 104 illustrated in FIG. 1. FIG. 6 illustrates an exemplary readout circuit operation. FIG. 6 may be a timing chart indicating an operation of the readout circuit 104 illustrated in FIG. 1. The readout circuit 104 includes an error detection circuit 500, a logical multiplication (AND) circuit 516, and a latch circuit 517. The readout circuit 104 receives the data D1 from the secondary cache memory 103, and outputs the data Q3 to the primary cache memory 102. The error detection circuit 500 includes latch circuits 511 and 512, a delay element 513, an exclusive-OR circuit 514, and a logical negation (NOT) circuit 515. The delay element 513 may be, for example, a buffer, and outputs a clock signal CK2 which is a clock signal CK delayed by a delay time T2. For example, a cycle T1 of the clock signal CK1 may be 400 ps, and the delay time T2 may be 30 ps. The primary cache memory 102 illustrated in FIG. 1 is coupled in between the latch circuit 517 and the central processing unit core 101.

At time t1, the readout data D1 of the secondary cache memory 103 changes from a high-level to a low-level in responsive to a readout in the secondary cache memory 103. The error detection circuit 500 may fail to detect an error since a readout timing of the data D1 which changes from the high-level to the low-level occurs is before a threshold (time t1). At the time t1, the latch circuit 511 latches a low-level data D1 in synchronization with a rising edge of the clock signal CK1, and outputs a latched low-level data Q1. The clock signal CK1 may be a signal substantially the same as the clock signal CK. The latch circuit 512 latches the low-level data D1 in synchronization with a rising edge of the clock signal CK2, and outputs a latched low-level data Q2. The exclusive-OR circuit 514 may output a low-level error signal ER when the data Q1 and Q2 are substantially the same as each other, and a high-level error signal ER when the data Q1 and Q2 have different logical levels. The logical negation circuit 515 outputs a logically inverted signal of the error signal ER as a ready signal RE. The logical multiplication circuit 516 outputs a logically multiplied signal of the ready signal RE and the clock signal CK as a clock signal CK3. A low-level period of the ready signal RE does not overlap with a high-level period of the clock signal CK. Thus, the clock signal CK3 may be substantially the same as the clock signal CK. The latch circuit 517 latches the low-level data Q1 in synchronization with a rising edge of the clock signal CK3, and outputs a latched low-level data Q3.

From time t2 to time t3, the readout data D1 of the secondary cache memory 103 changes from the low-level to the high-level in responsive to a readout from the secondary cache memory 103. The error detection circuit 500 detects an error since a readout timing of the data D1 which changes from the low-level to the high-level is behind the threshold (time t2). For example, at the time t2, the latch circuit 511 latches the low-level data D1 in synchronization with a rising edge of the clock signal CK1, and outputs the latched low-level data Q1. After that, the latch circuit 512 latches a high-level data D1 in synchronization with a rising edge of the clock signal CK2, and outputs a latched high-level data Q1. The exclusive-OR circuit 514 outputs the low-level error signal ER when the data Q1 and Q2 are substantially the same as each other, and outputs the high-level error signal ER when the data Q1 and Q2 have different logical levels. The logical negation circuit 515 outputs a logically inverted signal of the error signal ER as the ready signal RE. The logical multiplication circuit 516 outputs a logically multiplied signal of the ready signal RE and the clock signal CK as the clock signal CK3. The low-level period of the ready signal RE overlaps with the high-level period of the clock signal CK. Thus, the clock signal CK3 is the clock signal CK that is restarted after stopping one cycle from the time t3 to the time t4. The latch circuit 517 latches the high-level data Q1 at the time t4 in synchronization with a rising edge of the clock signal CK3 after waiting one cycle from the time t3 to the time t4, and outputs the latched high-level data Q3 thus latched.

A period from the time t1 to the time t2 may correspond to, for example, readouts through the memory elements paths having earlier readout timings that fall within a 90% range of the yield illustrated in FIG. 3. The error detection circuit 500 does not detect any error since the readout timings of the data from the secondary cache memory 103 are before the threshold. The logical multiplication circuit 516 may correspond to a clock control circuit. The logical multiplication circuit 516 outputs the clock signal CK3, which does not include a temporary stoppage, to the latch circuit 517 when the error detection circuit 500 detects no error. The latch circuit 517 latches the data Q1 read out from the secondary cache memory 103 when the error detection circuit 500 detects no error.

A period from the time t2 to the time t3 may correspond to, for example, readouts through the memory element's paths having later readout timings that fall outside the 90% range of the yield illustrated in FIG. 3. The error detection circuit 500 detects an error since the readout timings of the data from the secondary cache memory 103 are behind the threshold. The logical multiplication circuit 516 may be a clock controller circuit. The logical multiplication circuit 516 outputs the clock signal CK3, which is restarted after a temporary stoppage, to the latch circuit 517 when the error detection circuit 500 detects an error. The latch circuit 517 latches the data Q1 read out from the secondary cache memory 103 after a lapse of a waiting period from the time t3 to the time t4 when the error detection circuit 500 detects an error.

The error detection circuit 500 detects an error when a readout timing of data is after the threshold due to a path to the latch circuit 517 from one of the plurality of memory elements in the secondary cache memory 103, from which the data is readout.

The error detection circuit 500 of FIG. 5 detects a level change of the data D1 as a readout timing. When the data D1 changes from the low-level to the high-level or from the high-level to the low level in responsive to a data readout, the error detection circuit 500 may fail to detect an error. Even when the readout timing is behind the threshold, the data D1 does not change the level. Accordingly, the latch circuit 517 latches a correct logical level data Q1 even when the clock signal CK3 does not have the temporary stoppage because of no error detection in the error detection circuit 500.

Figure 7:
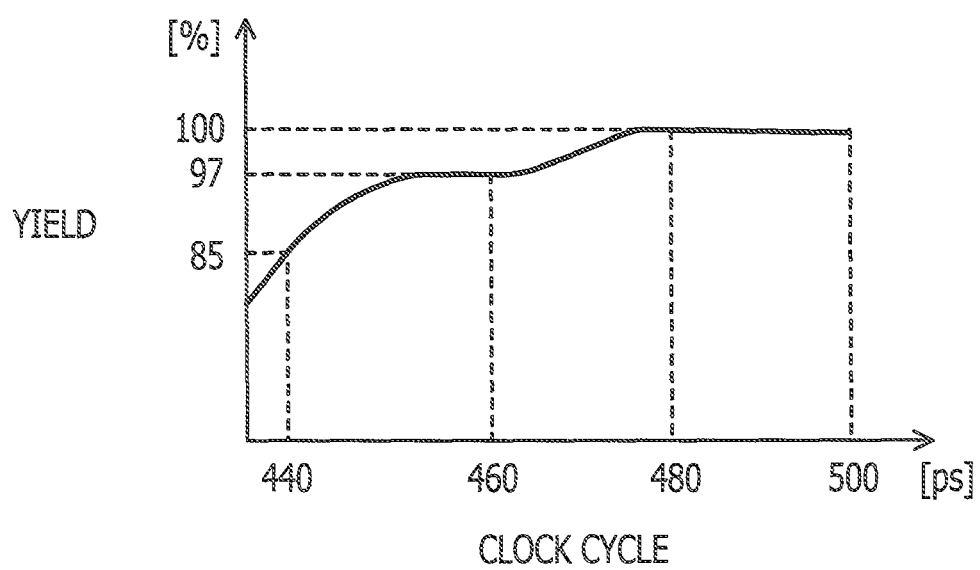
FIG. 7 illustrates an exemplary yield with respect to clock signal cycles.

FIG. 7 illustrates an exemplary yield with respect to a clock signal cycle. FIG. 7 may correspond to FIG. 3. FIG. 7 may be a graph illustrating the yield with respect to the cycle of the clock signal CK. The horizontal axis represents the cycle of the clock signal CK. The vertical axis represents the timing yield of timings when data is read in time from among the plurality of paths from the plurality of memory elements in the secondary cache memory 103 to the readout circuit 104. For example, the timing yield may be 99% when the cycle of the clock signal CK is 480 ps. The timing yield may be 97% when the cycle of the clock signal CK is 460 ps. The timing yield may be 85% when the cycle of the clock signal CK is 440 ps. The cycles of the clock signal CK, 480 ps, 460 ps, and 440 ps may be ones of settable cycles.

A processing speed increase rate E indicates an increase rate of processing speed when the cycle of the clock signal CK changes from a previous cycle To to a new cycle Tn, and is expressed by the following equation:

$$E=(To/Tn) \times x + \{To/(a \times Tn)\} \times (1-x) \quad (1)$$

"x" is the timing yield when the cycle Tn of the clock signal CK is used; and "a" is the number of cycles that take to execute a single order when an error is detected by the error detection circuit 500.

The equation (1) is formulated with an assumption such that all the paths from the secondary cache memory 103 to the readout circuit 104 are activated in equal proportion. The first term may be a term for a case where there is no error, and the second term may be a case where there is an error.

The processing speed increase rate E is calculated by using the equation (1) when the cycle Tn of the clock signal CK is 480 ps. Here, the timing yield x is 0.99; the previous cycle To of the clock signal CK is 500 ps; and the number-of-cycles a is 2.

$$E=(500/480) \times 0.99 \pm \{500/(2 \times 480)\} \times (1-0.99) \cong 1.036$$

The processing speed increase rate E is calculated by using the equation (1) when the cycle Tn of the clock signal CK is 460 ps. Here, the timing yield x is 0.97; the previous cycle To of the clock signal CK is 500 ps; and the number-of-cycles a is 2.

$$E=(500/460) \times 0.97 \ \{500/(2 \times 460)\} \times (1-0.97) \cong 1.071$$

The processing speed increase rate E is calculated by using the equation (1) when the cycle Tn of the clock signal CK is 440 ps. The timing yield x is 0.85; the previous cycle To of the clock signal CK is 500 ps; and the number-of-cycles a is 2.

$$E=(500/440) \times 0.85 + \{500/(2 \times 440)\} \times (1-0.85) \cong 1.051$$

The relations between the cycle Tn of the clock signal CK and the processing speed increase rate E are as follows:
E≅1.036 when Tn=480 ps and x=0.99;
E≅1.071 when Tn=460 ps and x=0.97; and
E≅1.051 when Tn=440 ps and x=0.85.

When the cycle Tn of the clock signal CK is 460 ps, the processing speed increase rate E may reach the highest value 1.071, and the processing speed may improve by 7.1%. Thus, the cycle Tn of the clock signal CK may be set to 460 ps. The frequency of the clock signal CK may be obtained based on an inverse of the cycle Tn. The cycle Tn of the clock signal CK is determined in response to the yield x of detecting no error in the plurality of paths from the plurality of memory elements in the secondary cache memory 103 to the readout circuit 104.

Figure 8A:
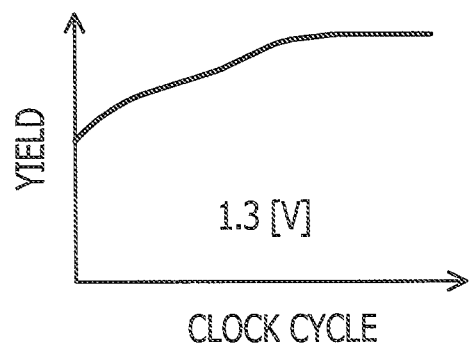
FIGS. 8A-8C illustrate an exemplary timing yield of a secondary cache memory.
Figure 8B:
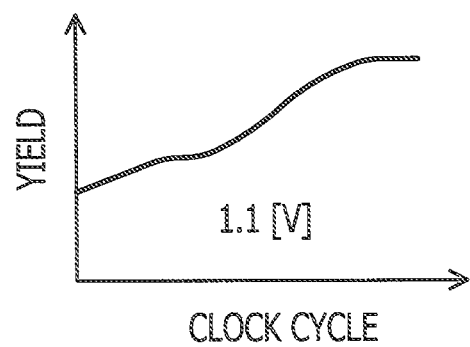
Figure 8C:
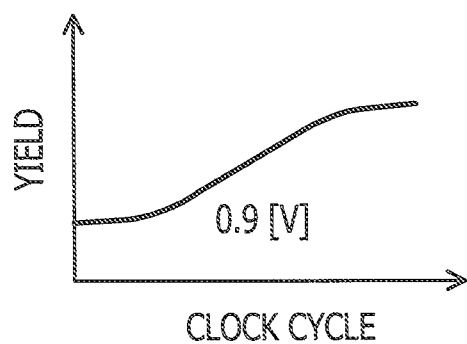

FIGS. 8A-8C illustrate an exemplary timing yield of a secondary cache memory. FIGS. 8A-8C may be graphs illustrating their respective timing yields for different power supply voltages Vdd of the secondary cache memory 103. In FIG. 8A, the power supply voltage Vdd may be 1.3 V. In FIG. 8B, the power supply voltage Vdd may be 1.1 V. In FIG. 8C, the power supply voltage Vdd may be 0.9 V.

In FIG. 8A, the power supply voltage Vdd is 1.3 V, which is high. Thus, the readout speed of the secondary cache memory 103 becomes faster, and the value of the yield x becomes larger. Accordingly, the processing speed increase rate E of the equation (1) becomes larger. A power consumption may become larger due to a higher power supply voltage Vdd.

In FIG. 8C, the power supply voltage Vdd is 0.9 V, which is low. Thus, the readout speed of the secondary cache memory 103 becomes slower, and the value of the yield x becomes smaller. Accordingly, the processing speed increase rate E of the equation (1) becomes smaller. The power consumption may become smaller due to a lower power supply voltage Vdd.

In addition to the processing speed increase rate E, in consideration of the power supply voltage Vdd, a performance increase rate E' is calculated by the following equation (2):

$$E'=E+b/Vdd \qquad (2)$$

where "b" is a constant.

The performance increase rate E' is an increase rate of performance based on the processing speed increase rate E in the first term and a power consumption indicator b/Vdd in the second term of the equation (2). The power consumption indicator b/Vdd may be an indicator which increases as the power supply voltage Vdd decreases. When the power supply voltage Vdd and the cycle Tn of the clock signal CK are set in such a way that the performance increase rate E' gives a largest value, the processing speed increase rate E becomes larger while the power consumption becomes smaller. The power supply voltage Vdd and the cycle Tn of the clock signal CK may be determined by selecting most suitable values from their respective settable candidates. A three-dimensional Pareto curved surface for the power supply voltage Vdd, the cycle Tn of the clock signal CK, and the timing yield x may be calculated. The power supply voltage Vdd and the cycle Tn of the clock signal CK may be set in such a way that the performance increase rate E' gives a largest value based on the three-dimensional Pareto curved surface. The cycle Tn of the clock signal CK and the power supply voltage Vdd of the secondary cache memory 103 are determined in response to the yield x of detecting no error in the plurality of paths from the plurality of memory elements in the secondary cache memory 103 to the readout circuit 104.

Figure 9:
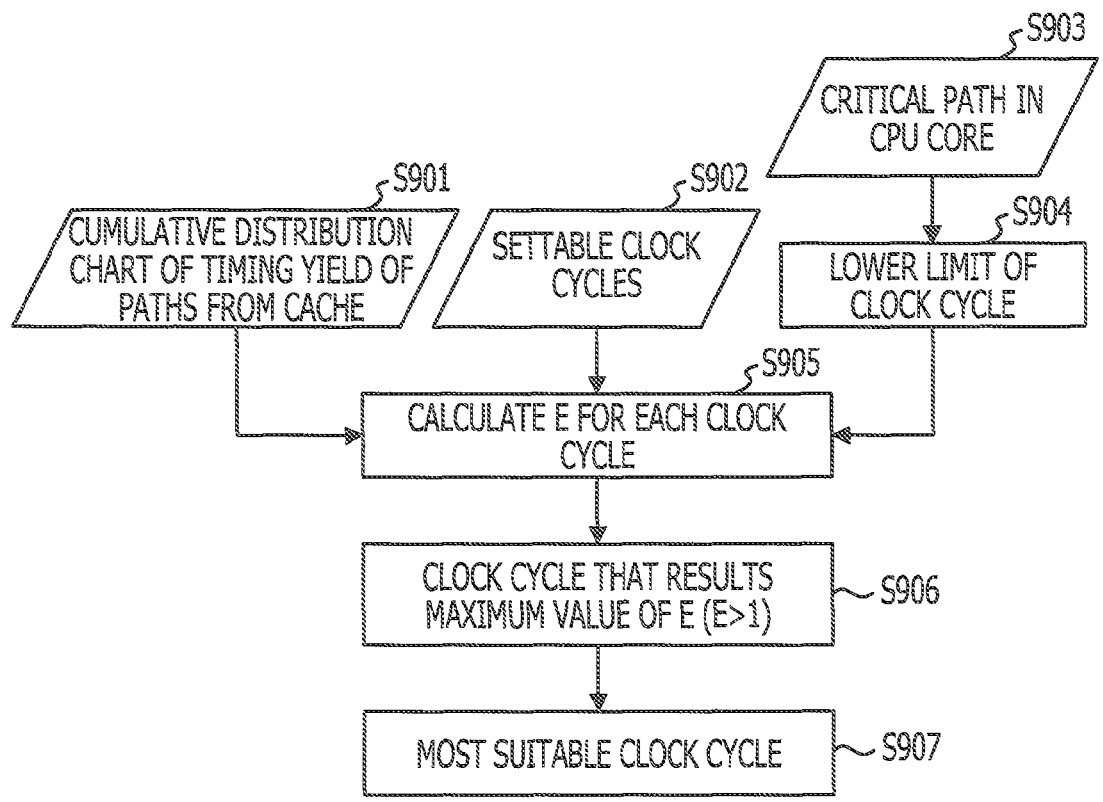
FIG. 9 illustrates an exemplary clock signal cycle setting process.

FIG. 9 illustrates an exemplary clock signal cycle setting process. FIG. 9 may be a flowchart illustrating a determination process of the cycle Tn of the clock signal CK by a CAD apparatus. The flowchart illustrated in FIG. 9 may correspond to the flowchart illustrated in FIG. 4.

In an operation S901, the CAD apparatus obtains a cumulative distribution chart of the timing yield of the plurality of paths from the plurality of memory elements in the secondary cache memory 103 to the readout circuit 104, as illustrated in FIG. 7, using the static timing analysis or the statistical static timing analysis.

In an operation S902, the CAD apparatus enters settable values of the cycle Tn of the clock signal CK such as, for example, 440 ps, 460 ps, 480 ps, etc.

in an operation S903, the CAD apparatus detects a critical path in the central processing unit core 101. In an operation S904, the CAD apparatus calculates a lower limit of the cycle Tn of the clock signal CK based on the critical path.

In an operation S905, the CAD apparatus calculates the processing speed increase rate E by using the equation (1) for each of the settable values of the cycle Tn of the clock signal CK entered in the operation S902, based on the timing yield cumulative distribution chart obtained in the operation S901, within a range longer than the lower limit of the cycle Tn of the clock signal CK calculated in the operation S904.

In an operation S906, the CAD apparatus obtains the cycle Tn of the clock signal CK that gives a maximum value of the processing speed increase rate E (E>1).

In an operation S907, the CAD apparatus determines the cycle Tn of the clock signal CK obtained in the operation S906 as a most suitable cycle Tn, and executes an output process such as displaying on a display, etc.

When the cycle Tn of the clock signal CK and the power supply voltage Vdd are determined by using the performance increase rate E' of FIGS. 8A-8C, a process substantially the same as or similar to the process illustrated in FIG. 9 may be performed.

Two cache memories 102 and 103 may be used. Only one cache memory 103 may be used.

When data path timing of a data path from the secondary cache memory 103 to the readout circuit 104 becomes a bottleneck in a determination of frequency of the clock signal CK, a less probable event where a readout timing of data from the secondary cache memory 103 does not occur in time is allowed to occur and the error detection circuit 500 is used. In response to an error detection in the error detection circuit 500, the latch circuit 517 latches data, whereby data is read from the secondary cache memory 103.

As illustrated in FIG. 7, the processing speed increase rate E is calculated based on the yield distribution calculated for the paths from the secondary cache memory 103. Accordingly, the frequency of the clock signal CK most suitable for bringing out a best performance of the central processing unit 100 may be set. As illustrated in FIGS. 8A-8C, the frequency of the clock signal CK may also be set based on the performance increase rate E' that takes into consideration the processing speed increase rate E and the power supply voltage Vdd.

The central processing unit 100 may be improved. For example, as illustrated in FIG. 7, the processing speed may increase by about 7% when the cycle Tn of the clock signal CK is set to 460 ps.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A processing unit, comprising:
    a cache memory including a plurality of memory elements;
    an error detection circuit configured to detect an error when a first timing for reading data from the cache memory lags behind a threshold;
    a latch circuit configured to latch the data before the certain time elapses when the error is not detected, and latch the data after a certain time elapses when the error is detected; a processing unit core configured to process the data latched by the latch circuit;
    and a clock control circuit configured to output to the latch circuit a first clock signal that is restarted after a temporary stoppage when the error is detected, and output to the latch circuit a second clock signal that does not include a temporary stoppage when no error is detected.

2. The processing unit according to claim 1, wherein the latch circuit latches the data after a lapse of a waiting period when the error is detected.

3. The processing unit according to claim 1, wherein the latch circuit latches in synchronization with one of the first clock signal and the second control signal.

4. The processing unit according to claim 1, further comprising a primary cache memory coupled between the latch circuit and the processing unit core,
wherein the cache memory is a secondary cache memory.

5. The processing unit according to claim 1, wherein the first timing is set based on a path from a memory element included in the plurality of memory elements to the latch circuit, the data being read from the memory element.

6. The processing unit according to claim 5, wherein the latch circuit latches in synchronization with a clock signal; and
a cycle of the clock signal is set in response to a yield of detecting no error in a plurality of paths from the plurality of memory elements.

7. The processing unit according to claim 6, wherein a power supply voltage of the cache memory is set in response to the yield of detecting no error in the plurality of paths.

8. A processing unit, comprising:
a cache memory including a plurality of memory elements;
an error detection circuit configured to detect an error when a first timing for reading data from the cache memory lags behind a threshold;
a latch circuit configured to set a second timing for latching the data based on an output from the error detection circuit and to latch the data at the second timing;
a processing unit core configured to process the data latched by the latch circuit; and
a clock control circuit configured to output to the latch circuit a first clock signal that is restarted after a temporary stoppage when the error is detected, and output to the latch circuit a second clock signal that does not include a temporary stoppage when no error is detected.

9. The processing unit according to claim 8, wherein the latch circuit latches in synchronization with one of the first clock signal and the second control signal.

* * * * *